(No Model.)
G. A. KEENE.
CURRY COMB.
No. 269,793. Patented Dec. 26, 1882.
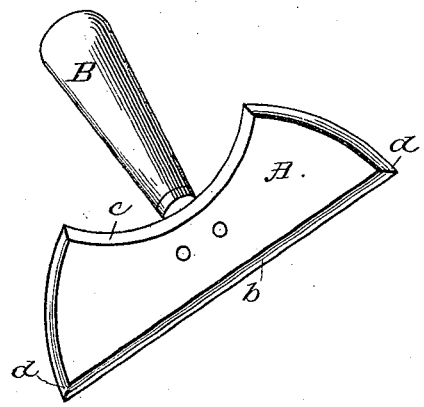
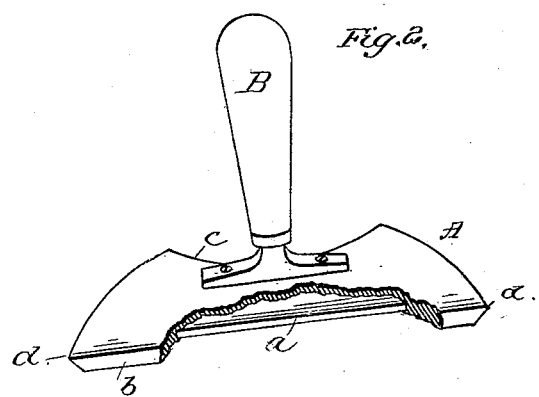

UNITED STATES PATENT OFFICE.

GEORGE A. KEENE, OF LYNN, MASSACHUSETTS, ASSIGNOR OF ONE-HALF TO SAWYER & CHASE, OF SAME PLACE.

CURRY-COMB.

SPECIFICATION forming part of Letters Patent No. 269,793, dated December 26, 1882.

Application filed June 24, 1882. (No model.)

*To all whom it may concern:*

Be it known that I, GEORGE A. KEENE, of Lynn, in the county of Essex and Commonwealth of Massachusetts, have invented certain new and useful Improvements in Combs for Currying Horses, of which the following, taken in connection with the accompanying drawings, is a specification.

This invention has reference to a class of devices for currying horses, and has for its object to produce an implement whereby moisture, arising from sweat or rain, may be easily and speedily removed from a horse, and the work of drying the horse be thereby greatly diminished.

This invention consists in a novel comb or scraper composed of rubber, having its edge faces suitably shaped to fit upon the various parts of the horse, and provided with a handle to facilitate its convenience for use, all of which are more fully described hereinafter, and specifically pointed out in the claim.

In the accompanying drawings, Figure 1 is a perspective view of my invention. Fig. 2 is also a perspective, looking at it from another point, and made partly in section to exhibit the construction in detail.

The blade A of the scraper is composed of rubber, made slightly flexible and provided with a metallic stiffening-plate, $a$, which is preferably molded in the rubber, but which may be clamped upon the outside thereof by means of rivets in an obvious manner. The blade so made is usually riveted or screwed to a handle, B, as shown, for convenience in using. On one side the blade is straight, as shown at $b$, and on the opposite side concaved, as at $c$, while the ends $d$ $d$ thereof are rounded or convex, as shown.

By reference to the drawings it will be seen that the blade A is extended laterally all round, and projects beyond its stiffening-plate $a$ on all sides for the purpose of allowing the said elastic blade to yield somewhat when borne against the surface of the horse, by which arrangement it may be used to much better advantage than a perfectly stiff scraper of the same shape could be, and by shaping the edges of the blade in the manner shown I am enabled to reach all parts of the body, particularly the hollows and curves, in a more effectual manner than could be accomplished with a comb or scraper having only one style of edge or working-surface.

I am aware that it is not new broadly to construct a curry-comb of a combination of metal and rubber, and I therefore disclaim the same, my invention being limited to my peculiar and novel construction, as hereinbefore described.

I claim—

A curry-comb composed of the india-rubber plate A, having the straight edge $b$, the opposite concave edge, $c$, and the rounded ends $d$ $d$, and stiffening-plate $a$, secured thereto, and the handle B, all substantially as described.

In testimony whereof I have signed this specification in presence of two witnesses.

GEO. A. KEENE.

Witnesses:
 C. B. TUTTLE,
 J. A. J. SAWYER.